United States Patent [19]

Jasinski et al.

[11] Patent Number: 4,918,437

[45] Date of Patent: Apr. 17, 1990

[54] HIGH DATA RATE SIMULCAST COMMUNICATION SYSTEM

[75] Inventors: Leon Jasinski, Ft. Lauderdale; Francis R. Steel, deceased, late of Parkland, all of Fla., by Lynne A. Steel, personal representative

[73] Assignee: Motorola, Inc., Schaumburg, Ill.

[21] Appl. No.: 257,904

[22] Filed: Oct. 13, 1988

[51] Int. Cl.$^4$ .............................................. H04B 7/00
[52] U.S. Cl. ......................... 340/825.44; 340/825.49; 455/33; 379/59; 379/60
[58] Field of Search .................... 340/825.08, 825.44, 340/825.47, 825.49; 370/84, 110.1; 379/58, 59, 60, 57; 455/30, 31, 16, 54, 59, 60, 62, 134

[56] References Cited

U.S. PATENT DOCUMENTS

| | | | |
|---|---|---|---|
| 4,247,908 | 1/1981 | Lockhart, Jr. et al. | 455/31 |
| 4,481,670 | 11/1984 | Freeburg | 455/62 |
| 4,525,861 | 6/1985 | Freeburg | 455/33 |
| 4,642,632 | 2/1987 | Ohyagi et al. | 370/84 |
| 4,670,906 | 6/1987 | Thro | 455/33 |
| 4,704,734 | 11/1987 | Menich et al. | 455/134 |
| 4,823,123 | 4/1989 | Siwiak | 340/825.44 |
| 4,825,193 | 4/1989 | Siwiak et al. | 340/825.44 |

Primary Examiner—Donald J. Yusko
Assistant Examiner—Eric Oliver Pudpud
Attorney, Agent, or Firm—Philip P. Macnak; Vincent B. Ingrassia; Anthony J. Sarli, Jr.

[57] ABSTRACT

A system for transmitting long text messages includes a plurality of transmission cells defining different geographical areas, each having a transmitter for simulcast address transmission at a first data bit rate and for transmitting the address and a message at a second data bit rate higher than the first data bit rate. A paging transceiver generates and transmits an acknowledgment signal in response to receiving a transmitted address at the first data bit rate. Receivers located within each of the transmission cells receive the transmitted acknowledgment signal. An apparatus responsive to the received acknowledgment signal identifies the transmission cell in which the paging transceiver is located effecting the selection of the transmitter in the transmission cell in which the paging transceiver is located to transmit the address and message at the second data bit rate higher than the first data bit rate.

10 Claims, 16 Drawing Sheets

SIMULCAST TRANSMISSION

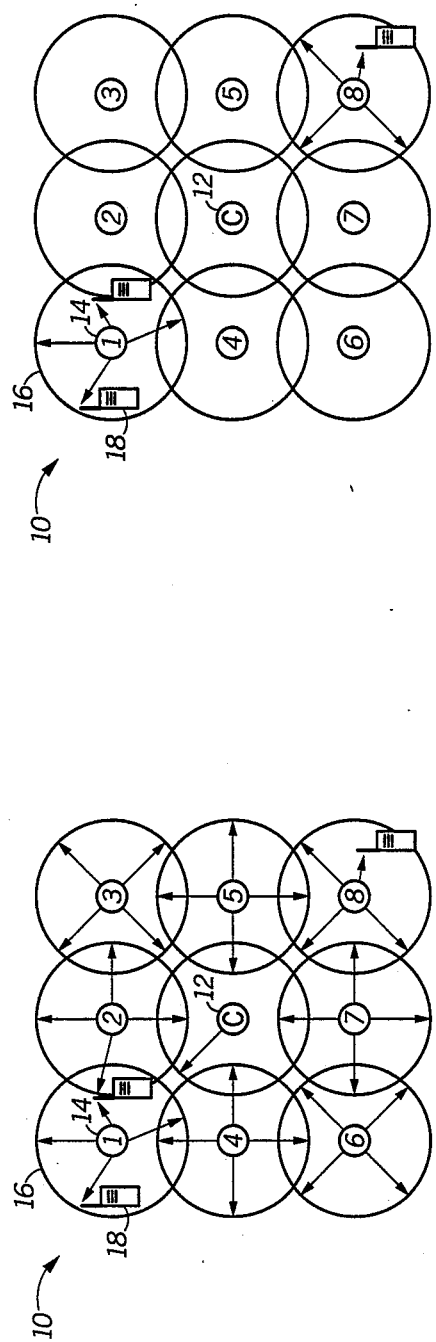
FIG. 1 —PRIOR ART—
ALPHA = ALPHANUMERIC MESSAGE
N = NUMERIC MESSAGE
T = TONE ONLY PAGE
FIG. 2A SIMULCAST TRANSMISSION
FIG. 2B NON-SIMULCAST TRANSMISSION

PSEUDO-SIMULCAST TRANSMISSION

CENTRAL STATION

REMOTE SITE

CENTRAL STATION OPERATION

CENTRAL STATION
OPERATION

CENTRAL STATION OPERATION

REMOTE STATION OPERATION

REMOTE STATION OPERATION

REMOTE STATION OPERATION

PAGING RECEIVER OPERATION

PAGING RECEIVER OPERATION

PAGING RECEIVER OPERATION

HIGH DATA RATE SIMULCAST COMMUNICATION SYSTEM

FIELD OF THE INVENTION

This invention relates to the field of data communication systems, and more particularly to a data communication system providing simulcast radio frequency data transmission capability for long data messages transmitted at high data rates.

BACKGROUND OF THE INVENTION

Numerous data communication systems are available providing data message delivery. One such system having great popularity, the radio paging system, can deliver numeric and alphanumeric messages originated by a caller, using a telephone or an alphanumeric messaging terminal. The messages are then transmitted to a numeric or alphanumeric display pager. Radio paging systems deliver the messages using a variety of signaling formats, such as the Golay Sequential Code (GSC) and POCSAG signaling formats to small portable receivers referred to as pagers. The POCSAG signaling format is shown in FIG. 1A. As shown, a synchronization code (SC) is first transmitted, which is used by all paging receivers, or pagers, within the system for maintaining synchronization with the transmitted information. The synchronization code (SC) is followed by eight frames, F1–F8. Each frame provides for the transmission of address blocks (A) and data blocks (M). Pagers are assigned to a specific one of the eight frames, providing the pager a battery saving function. The pagers are generally configured as tone-only pagers (T) responding only with an audible alert when paged, numeric pagers (N) responding with an audible alert and a displayed numeric message, such as a telephone number when paged, or alphanumeric pagers (Alpha) responding with an audible alert and a displayed alphanumeric message when paged. The paging system transmits only the address identifying the pager being paged for tone-only pagers, and an address identifying the pager to which a message is intended followed by the message for numeric and alphanumeric pagers. As shown in FIG. 1A, two tone-only address blocks can be transmitted in a single frame, while a simple seven digit phone number, which is encoded using a four bit binary data format, requires transmitting an address block followed by two data blocks, continuing part of the message into the next POCSAG frame. Alphanumeric messages, which are encoded using a seven bit BCH data format, can extend into many frames and requires substantially more air time to transmit than either the tone-only or numeric pages. Consequently, the transmission of numeric and alphanumeric messages on a paging system reduces the number of pagers that can be loaded onto the system, and this problem is compounded when long alphanumeric messages are transmitted. One solution which has been proposed for this problem is to increase the data transmission rate to 1200 bits per second from the current standard 512 bits per second. However, even this solution has proven inadequate for transmitting long data messages.

In order to obtain the message throughput required to handle long alphanumeric messages, substantially higher data rates, such as at 2400 or 4800 bits per second, or even higher are required. However, most paging systems in use today employ simulcast transmission of information to provide wide area coverage. Such paging systems employ a number of transmitters geographically separated, which are located in a cellular, or pseudo-cellular, fashion to provide the required coverage, and all transmitters transmit the same information simultaneously in all cells or zones. While conventional frequency modulated (FM) simulcast transmission systems can provide adequate message transmission at data rates below 2400 bits per second, they become difficult to set up and have not reliably been used to transmit messages at higher data rates. Problems, such as with providing proper phase equalization and synchronization of the transmission of the transmitters within the system become substantially more difficult at higher data rates.

Another problem that exists in the transmission of long messages, is insuring the message being transmitted, has been received by the pager for which it is intended, otherwise valuable air-time is wasted. Failure to receive the message can occur when the pager is out of range of the transmitters, has not been turned on by the user, has a dead battery, or has a battery that has died during the operating day. In providing a paging system capable of transmitting long messages, it is extremely important to know the messages being transmitted are likely to be received, otherwise valuable air-time is lost.

SUMMARY OF THE INVENTION

It is therefore an object of the present invention to provide a communication system providing increased message throughput.

It is a further object of the present invention to provide a communication system providing increased message throughput utilizing simulcast transmitter operation.

It is a further object of the present invention to provide a communication system providing reliable message throughput at high data transmission rates.

Generally, a system for transmitting long text messages includes a plurality of transmission cells each having a transmitter for simulcast address transmission at a first data bit rate and for transmitting the address and a message at a second data bit rate higher than the first data bit rate. A paging transceiver generates and transmits an acknowledgement signal having predetermined characteristics in response to receiving the transmitted address at the first data bit rate. Receivers located within each of the transmission cells receive the transmitted acknowledgement signal. A selecting means responsive to the received acknowledgement signals selects the transmission cell in which the paging transceiver is located effecting the transmission of the address and message at the second data bit rate higher than the first data bit rate in the selected transmission cell in which the paging transceiver is located.

Another embodiment of a system for transmitting long text messages includes a plurality of transmission cells each having a transmitter for simulcast address transmission at a first data bit rate and for transmitting the address and a message at a second data bit rate higher than the first data bit rate. A paging transceiver generates and transmits an acknowledgement signal having predetermined characteristics in response to receiving the transmitted address at the first data bit rate. Receivers located within each of the transmission cells receive the transmitted acknowledgement signal. A selecting means responsive to the received acknowledgement signals selects the transmission cell in which the paging transceiver is located, and further selects one or more transmission cells adjacent the transmission cell in which the paging transceiver is located for effecting the simulcast transmission of the address and message at the second data bit rate higher than the first data bit rate in the selected transmission cell in which the paging transceiver is located and in the selected adjacent transmission cells.

These and other objects and advantages of the present invention will become more apparent to those skilled in the art by referring to the following detailed description and accompanying diagrams.

DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which and wherein:

FIG. 1 is a timing diagram showing an example of data transmission utilizing the POCSAG signaling format.

FIG. 2A is a line drawing depicting the simulcast transmission mode in the preferred embodiment of the present invention.

FIG. 2B is a line drawing depicting the non-simulcast transmission mode for high data rate messages in the preferred embodiment of the present invention.

DESCRIPTION OF A PREFERRED EMBODIMENT

Figure 2C:
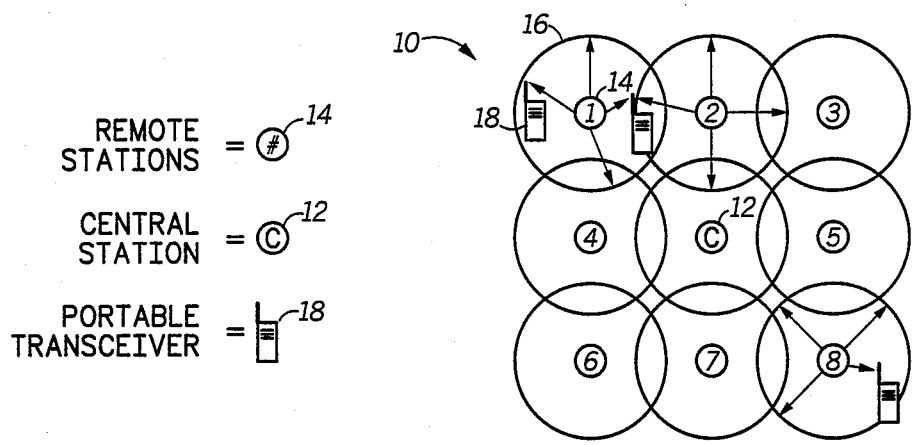
FIG. 2C is a line drawing depicting the pseudo-simulcast transmission mode for high data rate messages in the preferred embodiment of the present invention.

With respect to the figures, FIGS. 2 through 10 illustrate in general several preferred embodiments of the present invention. Referring to FIG. 2A, a typical simulcast communication system 10 is shown which includes a substantially centrally located central station 12 (identified by the letter C) surrounded by a plurality of remote stations 14 (identified by the numbers 1-8). System 10, as shown in FIG. 2A, is arranged in a substantially cellular pattern, comprising a plurality of transmission cells 16 defining different geographical areas wherein the central station 12 and remote stations 14 are located, thereby providing wide area coverage for a plurality of communication transceivers, such as paging transceivers 18, operating within the system. While system 10 shows a regular arrangement of transmission cells 16, it will be appreciated by one of ordinary skill in the art, that the arrangement of transmission cells 16 need not be regularly distributed to provide a wide area simulcast transmission system for a particular geographical area. It will also be appreciated that the number of remote stations which is shown is for example only, and depending upon the area of coverage, the system may have more or less remote stations than shown. It will also be appreciated, that the location of central station 12 relative to that of remote stations 14, need not necessarily be centrally located, as shown, so long as central station 12 be able to communicate with remote stations 14 in the manner to be described shortly.

Messages are entered into system 10 via central station 12 and formatted into a predetermined signaling format having address and message segments, to be described in detail shortly. The formatted messages are stored for a predetermined time interval, also to be described in detail shortly, after which they are transmitted as a burst signal, or packet of information, at a very high data rate, such as 19.2 or 38.4 kilobits per second for the preferred embodiment of the present invention, from central station 12 to remote stations 14. The address segments of the burst signal are then simulcast from remote station 14 and central station 12 on a common radio (R.F.) frequency in a manner well known to one of ordinary skill in the art. The address segments are transmitted at a first data bit rate, such as 512 or 1200 bits per second, thereby providing reliable simulcast transmission to the plurality of paging transceivers 18 operating within system 10. It will be appreciated that other bit rates may also be employed, particularly when other signaling formats are employed, and that the preferred embodiment of the present invention is not limited to the data transmission rates indicated by example. Each paging transceiver 18 is assigned a unique address to which it is responsive. Upon receiving and detecting an address corresponding to the assigned address for each paging transceiver 18, each addressed paging transceiver 18 generates an acknowledgement signal in a manner to be described in detail shortly. The acknowledgment signals, which have predetermined characteristics, such as a predetermined transmission frequency, signal strength and signal phase characteristics, are generated by paging transceivers 18. The transmitted acknowledgement signals are received at one or more remote stations 14 or central station 12. The received acknowledgment signals allow system 10 to identify the transmission cells 16 in which each responding paging transceiver 18 is located. Once the location of paging transceivers 18 have been determined, the messages, which are stored at central station 12, corresponding to each paging transceiver 18 are tagged identifying one or more remote stations 14 to be used in the subsequent transmission of the message.

The tagged messages are transmitted at the burst signal data rate described previously to the remote stations on the next central station transmission cycle. While all remote stations 14 receive the tagged messages, only those remote stations to which the messages are tagged, process the messages as will be described shortly. Messages received at the appropriate remote stations 14 are re-transmitted in one of two embodiments of the present invention by the remote stations at a second data bit rate higher than the first data bit rate, such as 240 or 4800 bits per second. It will be appreciated that the bit rates indicated are by way of example only, and that other bit rates may be satisfactorily employed. In the first embodiment of the present invention shown in FIG. 2B, the messages are transmitted only from the remote stations 14 transmitter within the transmission cell 16 where the acknowledging paging transceiver 18 was located. This method allows interference free transmission of lengthy messages on a common R.F. frequency without interference to the other paging transceivers 18 also receiving lengthy messages in other transmission cells. Interference-free transmission is assured by providing simultaneous message transmission in non-adjacent transmission cells. Where simultaneous message transmission is anticipated within adjacent transmission cells, the transmission from one cell to the next would be delayed so as to avoid interference of the two messages.

In the second embodiment of the present invention shown in FIG. 2C, messages are transmitted in a manner similar to the description of FIG. 2B, except that selected remote station transmitters in transmission cells 16 adjacent to the transmission cell in which portable transceiver 18 is located are used to provide a localized pseudo-simulcast transmission of the messages. Pseudo-simulcast transmission requires the measurement of the propagation delay of the acknowledgment signal to the central station and each of the remote stations. Once the propagation delays have been determined, the differential propagation delays between the central station and the remote stations can be determined. This information together with the location of the paging transceiver determined using the received signal strength permits the selection of one or more additional transmitters in adjacent transmission cells to be used for transmission thereby allowing high data bit rate transmissions without experiencing large differential propagation delays which would otherwise corrupt the transmission. Information on differential propagation delays can be included with the address and message information during the transmission of the burst signal allowing phasing corrections to be made for the transmissions of adjacent remote station transmitters. Such pseudo-simulcast transmission is advantageous in providing more reliable message delivery, especially in those geographic areas common between adjacent transmission cells 16, and in other locations such as buildings, where transmission losses from a particular transmitter may be extremely high so as to degrade message delivery. Compared to the single transmitter transmission of FIG. 2B, a 3 dB improvement in signal strength is obtained with two stations operating, a 5 dB improvement is obtained with three stations operating, and a 6 dB improvement is obtained with four stations operating. Beyond four stations, the complexity of phase correcting the transmissions of multiple stations for the high bit rate transmissions becomes extremely complex. Pseudo-simulcast transmission of messages also minimizes the problem of transmitting different messages in adjacent transmission cells, as previously described in the non-simulcast mode of operation.

Figure 3:
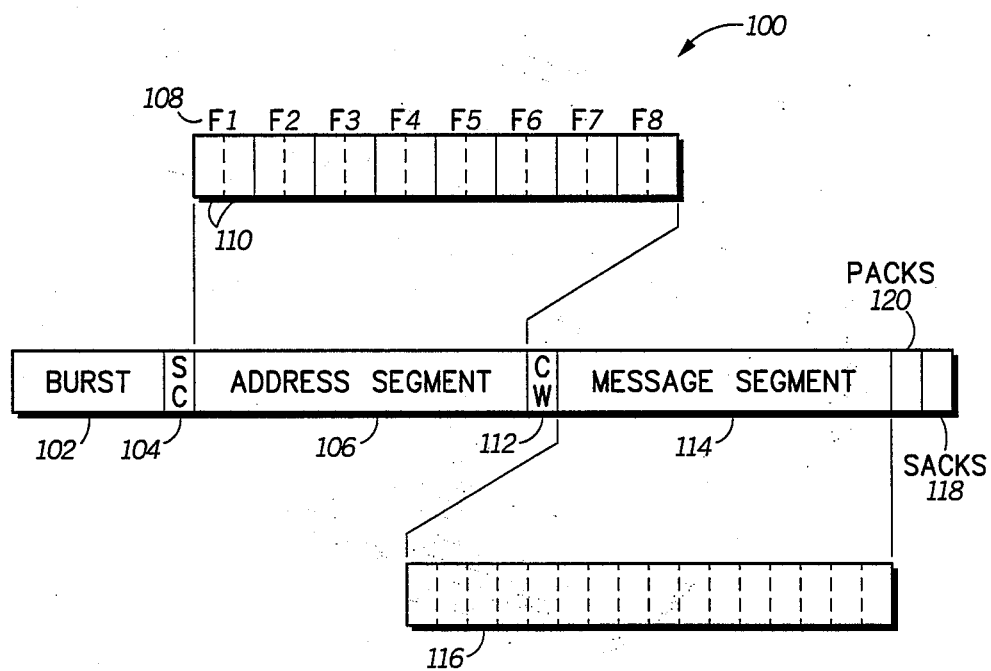
FIG. 3 is a timing diagram showing the signaling format of the preferred embodiment of the present invention

FIG. 3 shows a timing diagram of the signaling format 100 of the preferred embodiment of the present invention. Signaling format 100 comprises a transmission time interval for the burst signal 102, during which the burst signal is transmitted at the very high data rate previously described, from the central station to the remote stations. A detailed description of burst signal 102 will be described in FIG. 4.

Returning to FIG. 3, a synchronization codeword (SC) 104 follows burst signal 102. Synchronization codeword 104 is used by the paging transceivers to maintain synchronization with the system in a manner well known to one of ordinary skill in the art. Such synchronization allows for decoding of addresses and messages to follow, as well as for battery saving purposes.

Address segment 106, shown in FIG. 3, follows synchronization codeword 104. The POCSAG signaling format is shown for example in address segment 106 of the preferred embodiment of the present invention and comprises eight frames 108. Each frame includes two address codewords 110, providing for the transmission of two addresses per frame. Each address codeword 110 is a thirty-two bit binary codeword comprising a 31,21 BCH codeword and a single block error check bit, as is well know in the POCSAG signaling format. The addresses are transmitted at the first data bit rate previously described. It will be appreciated by one of ordinary skill in the art that other signaling formats, such as the Golay Sequential Code, or GSC signaling format, could also be used in the delivery of addresses during address segment 106.

Silent carrier (CW) 112, shown in FIG. 3, follows address segment 106. During this time interval, unmodulated or silent carrier is simulcast transmitted by the central and remote stations in the system. Silent carrier (CW) 112 is used by the paging transceivers to adjust transmitter frequency and power output prior to the transmission of an acknowledgement signal acknowledging the reception of the address, thereby guaranteeing known acknowledgement response characteristics. The transmitter frequency adjustment process is described in detail in copending U.S. Patent Application, Ser. No. 07/141,655, filed Jan. 7, 1988, entitled "Acknowledge Back Pager with Apparatus for Controlling Transmit Frequency", and U.S. Patent Application Ser. No. 07/141,653, filed Jan. 7, 1988, (now U.S. Pat. No. 4,823,123, issued Apr. 18, 1989) entitled "Acknowledge Back Pager with Frequency Control Apparatus". The power output level adjustment is described in copending U.S. Patent Application No. 07/141,370, filed Jan. 7, 1988, (now U.S. Pat. No. 4,825,193 issued Apr. 25, 1988) entitled "Acknowledge Back Pager with Adaptive Variable Transmitter Output Power". The three applications are assigned to the assignee of the present invention, and are hereby incorporated for reference herein.

Message segment 114, shown in FIG. 3, follows silent carrier (CW) 112. Message segment 114 includes a plurality of message blocks 116 corresponding to addresses transmitted during the previous transmission cycle. Each message block 116 includes transmitter control information identifying one or more remote stations which will be used to transmit each message, the address associated with the message, and an end of message indicator, which is shown in greater detail in FIG. 4. Unlike address segment 106, it will be appreciated message segment 114 is not a fixed number of data blocks in length, but rather varies depending upon the length of the message to be transmitted. Message segment 114 is transmitted at the second data bit rate of 2400 or 4800 bits per second, as previously described. The second data bit rate provides for the transmission of two to eight times the message length in a time interval equal to the first data bit rate of 512 or 1200 bits per second, thereby greatly increasing message throughput.

Acknowledgement signals (PACKS) 118, shown in FIG. 3, are transmitted simultaneously by all paging transceivers having received and detected an address during address segment 106. PACKS 118 can be encoded by several methods, one of which is described in copending U.S. Patent Application Ser. No. 07/141,654 filed Jan. 7, 1988, entitled "Frequency Division Multiplexed Acknowledge Back Paging System", which is assigned to the assignee of the present invention, and is hereby incorporated for reference herein. U.S. Patent Application Ser. No. 07/141,654 describes a frequency division multiplex method allowing a group of paging transceivers to simultaneously acknowledge during a common time interval. In the preferred embodiment of the present invention, sixteen paging transceivers are shown potentially responding, although it will be appreciated that more or less paging transceivers may acknowledge in the time interval provided. An alternate embodiment for encoding the acknowledgement signals for simultaneous transmission to the remote stations is described in copending U.S. Patent Application Ser. No. 07/141,656, filed Jan. 7, 1988, entitled "Code Division Multiplexed Acknowledge Back Paging System", which utilizes orthogonal codes to provide code division multiplexing of the encoded acknowledgement signals onto a common carrier frequency, which is hereby incorporated by reference herein.

PACKS 118, received at the central and remote stations, are processed to identify the responding paging transceivers, and to determined the received signal strength at each remote station. Processing of the received PACKS include decoding the PACKS, error correcting the resultant information, and re-encoding the resultant information for SACK transmission. This results in enhanced reliability in the location of responding paging transceivers. Time of acknowledgement reception may also be obtained at this time, as will be described in detail later. The received signal strength and time of reception information is encoded into a suitable format for transmission from the remote stations to the central station during the system acknowledgement time interval (SACKS) 120. SACKS 120 are transmitted from the remote stations to the central station also at a high data bit rate, such as 9600 bits per second. Once the received signal strength and time of reception information is received from all remote stations in the system, the information is processed at the central station to identify the transmission cells having paging transceivers acknowledging the addresses transmitted during address segment 106. The messages corresponding to the addresses transmitted during address segment 106 are tagged to indicate in which transmission cell each paging transceiver is located. This tagged message information is then temporarily stored and transmitted to the paging transceivers during the next transmission cycle.

Figure 4:
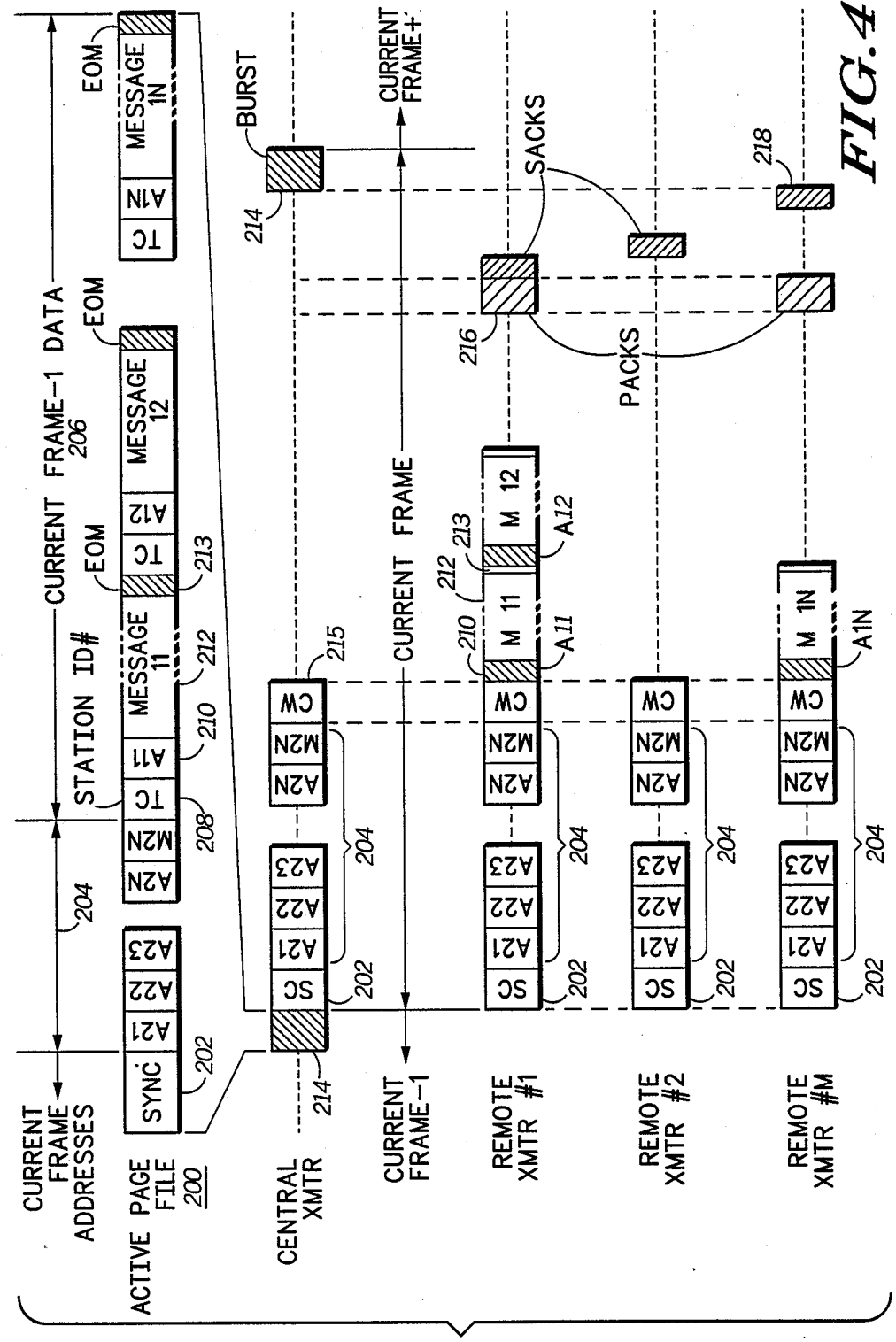
FIG. 4 is a timing diagram showing the application of the signaling format of FIG. 3 in a simulcast transmission system.

The operation of simulcast transmission system 10 utilizing transmission cycle 100 will be better appreciated by considering FIG. 4 which shows a timing diagram of the operation of a typical simulcast system incorporating the preferred embodiment of the present invention. As messages are inputted into the system, they are stored in a memory, to be described shortly, which is depicted by active page file 200. Active page file 200 includes a synchronization codeword 202 followed by a current frame address segment 204 and a current frame-1 data segment. The current frame address segment 204 corresponds to address segment 106 previously described, while the current frame-1 data segment 206 corresponds to message segment 114 previously described. As also shown in FIG. 4, current frame address segment 204, may also be used in certain instances for message transmission, such as for very short message paging where the message is no more than one address block in length. When messages are transmitted in current frame address segment 204, they are positioned at the end of the address segment, as shown, as acknowledgement responses are determined by the order of address transmission as described in copending U.S. Patent Application Ser. No. 07/141,654.

Current frame-1 data segment 206, shown in FIG. 4, contains the message information corresponding to the addresses transmitted in the previous transmission cycle. The current frame-1 data segment 206 includes transmitter control codewords 208 followed by paging transceiver addresses 210, messages 212 and end-of-message (EOM) delimiters 213. Transmitter control words 208 identify the transmission cells in which responding paging transceivers were located during the previous transmission cycle. The active page file 200 is transmitted from the central station to the remote stations during the burst signal 102 transmission.

Following the receipt of the active page file 200 by the remote stations, the synchronization codeword 202 and current frame address segment 204 are simulcast by the central and remote stations. Following the transmission of the current frame address segment 204, the central station and remote stations transmit an interval of silent carrier 215, during which time the paging transceivers receiving the addresses transmitted in the address segment adjust transmit frequency and power output. The current frame-1 data segment 206 is then transmitted in a non-simulcast or pseudo simulcast manner from those stations, central or remote, designated as having paging transceivers located in their transmission cells, as previously described.

The transmission cycle is further understood by considering the specific example of the operation of the central and remote stations as shown in FIG. 4. Remote station #1 was determined during the previous transmission cycle to have two paging transceivers located within its transmission cell, paging transceivers corresponding to addresses A11 and A12. Furthermore, remote station #8 was determined to have a single paging transceiver located within its transmission cell, paging transceiver AIN. As previously described, as burst signal 214 was received at each remote station, the information corresponding to the current frame-1 data segment 206, is processed. Consequently, only remote stations 1 and 8, which were tagged as having responsive paging transceivers, accepted messages from the current frame-1 data segment 206. In this case, remote stations 1 and 8 independently and simultaneously transmitted the messages processed during the message segment 206 reception. As shown, such a system benefits by providing frequency reuse of a single channel which results in increased message throughput by transmitting different messages in those transmission cells where the individual paging transceivers are located. The central and remaining remote stations, as shown, remained unkeyed during the transmission of the current frame-1 data segment 206.

As previously described, those paging transceivers receiving addresses during address segment 204, acknowledged receipt of the address during the PACK 216. The PACKS received at the various remote stations are processed, and then retransmitted to the central station during the SACKS 218 time interval. As shown in FIG. 4, the SACKS are transmitted back in a sequential manner starting in numeric sequence with the corresponding remote stations. This information received at the central station is used to tag the current frame data which is then transmitted in the next transmission cycle. Should any paging transceiver be non-responsive, those messages are stored, and after a period of time, such as five minutes, and the non-responsive paging transceiver address is again re-transmitted in an attempt to locate the paging transceiver. Air time is saved by not transmitting messages to a non-responsive paging transceiver. If the paging transceiver again does not respond, the message may again be stored for transmission at a later time.

Figure 5:
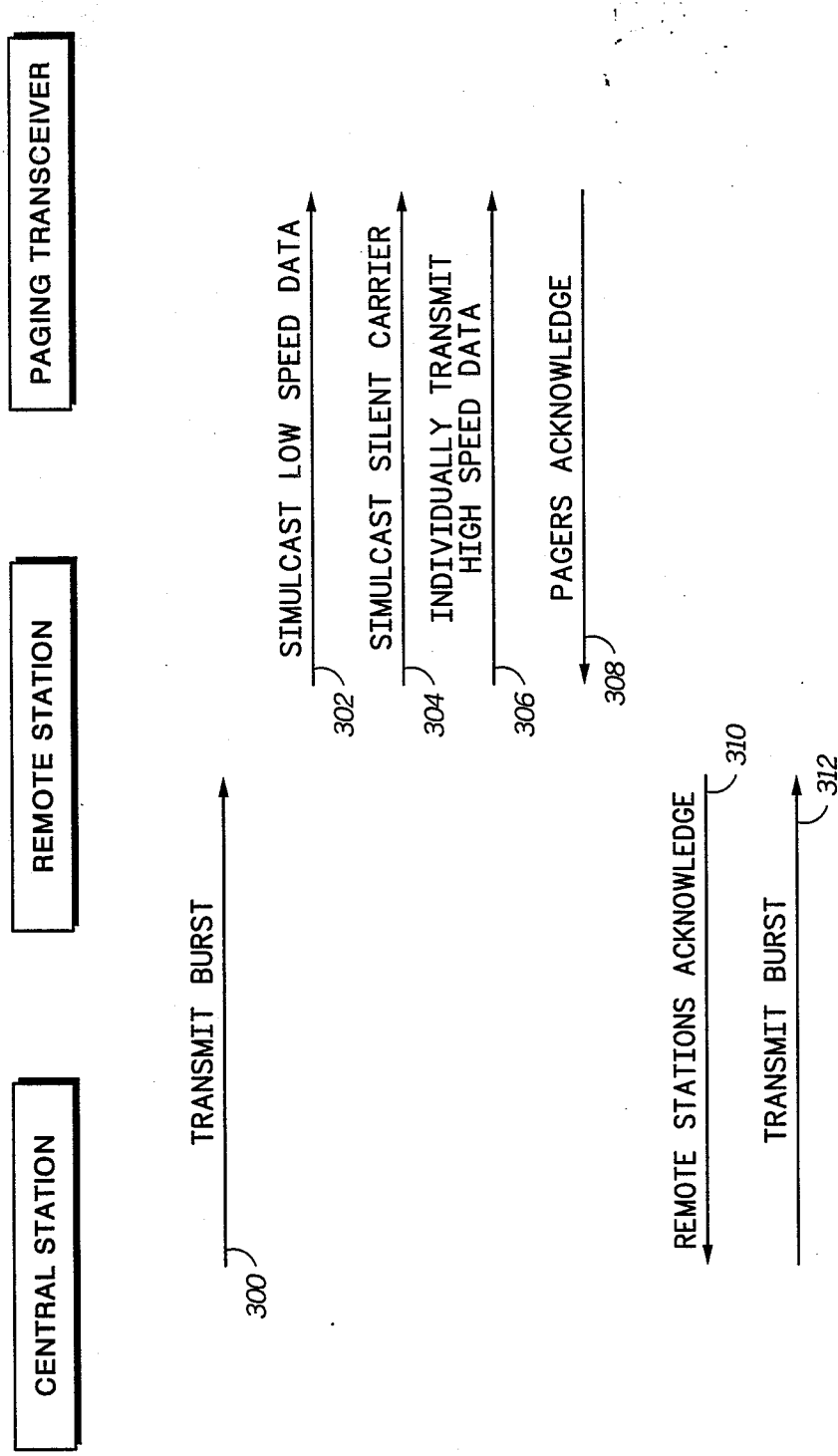
FIG. 5 is a line drawing showing the flow of data and control information for the simulcast transmission system described in FIG. 4.

FIG. 5 shows a line drawing of the transmission sequences performed in the preferred embodiment of the present invention, and is used to recap the previous operations described. The central station transmits burst signal 300 containing address and message segments at a very high data rate to the remote stations. This information is received at the remote stations and processed for re-transmission. The synchronization codeword and the address segments are simulcast transmitted by central and remote stations 302 at a data rate insuring reliable simulcast transmission throughout the system. The central and remote stations then simulcast transmit silent, or unmodulated carrier 304 for a duration sufficient for the responsive paging transceivers to adjust their transmitting frequency and output power. Next, the remote stations which were tagged as having paging transceivers located within each station's transmission cell on the previous transmission cycle, individually transmit the messages in a non-simulcast or pseudo simulcast manner, at a high da rate, thereby efficiently delivering long data messages 306. The responsive paging transceivers during the address segment transmission then acknowledge receipt of the address by transmitting an acknowledgement signal to the remote stations 308, thereby allowing the system to locate the transmission cell in which the responsive paging transceivers are located, for use during the next transmission cycle. The remote stations next transmit the received signal strength and time of signal reception information derived from the received acknowledgement signals to the central station 310 sequentially at a high data bit rate. The information is processed and is used to tag the messages to be retransmitted during the next transmission cycle. The central station then assembles a new active page file and transmits this information to the remote stations 312, thereupon initiating a new transmission cycle.

Figure 6A:
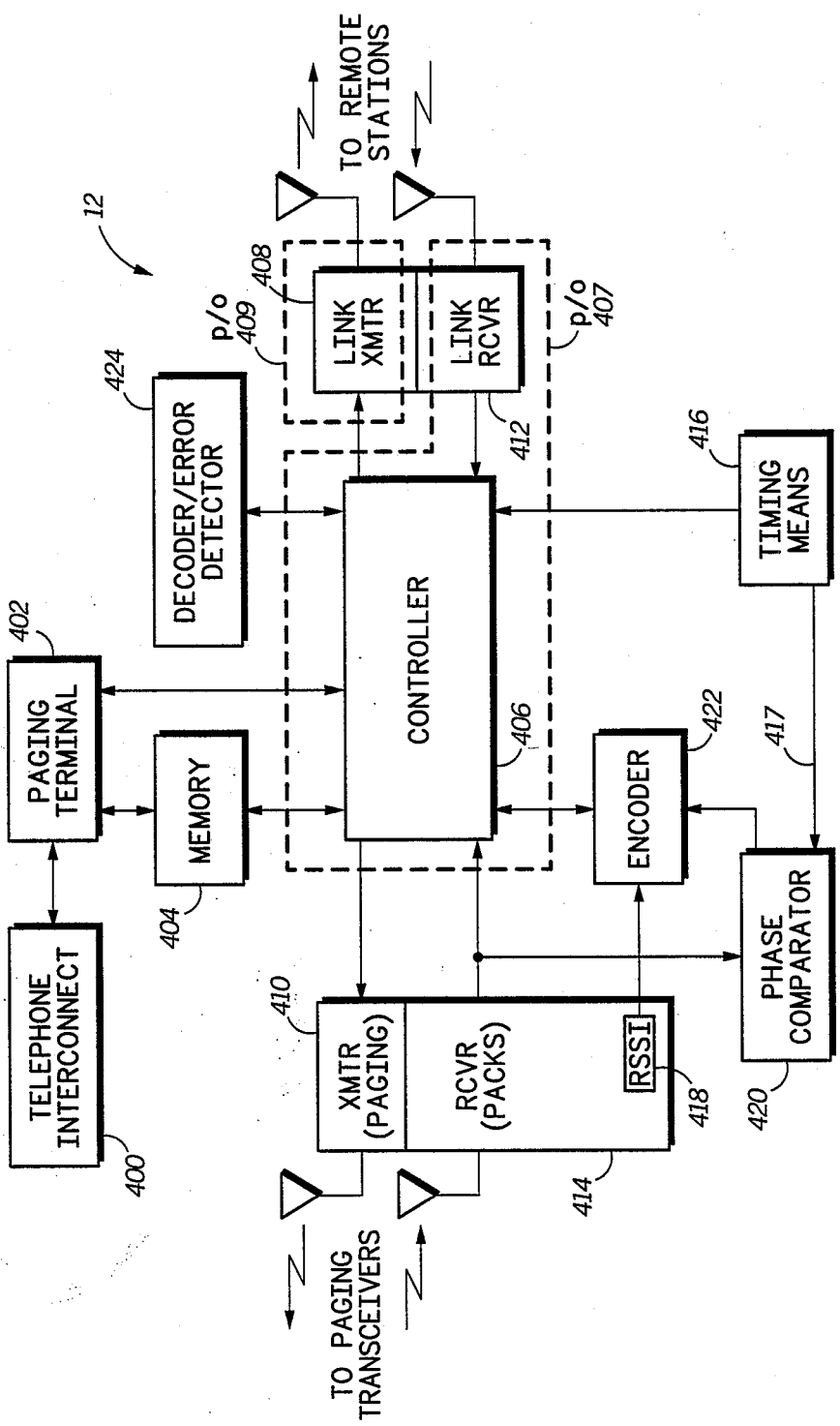
FIGS. 6A and 6B are electrical block diagrams of the central station transmission facility and the remote site transmission facilities of the preferred embodiment of the present invention.
Figure 6B:
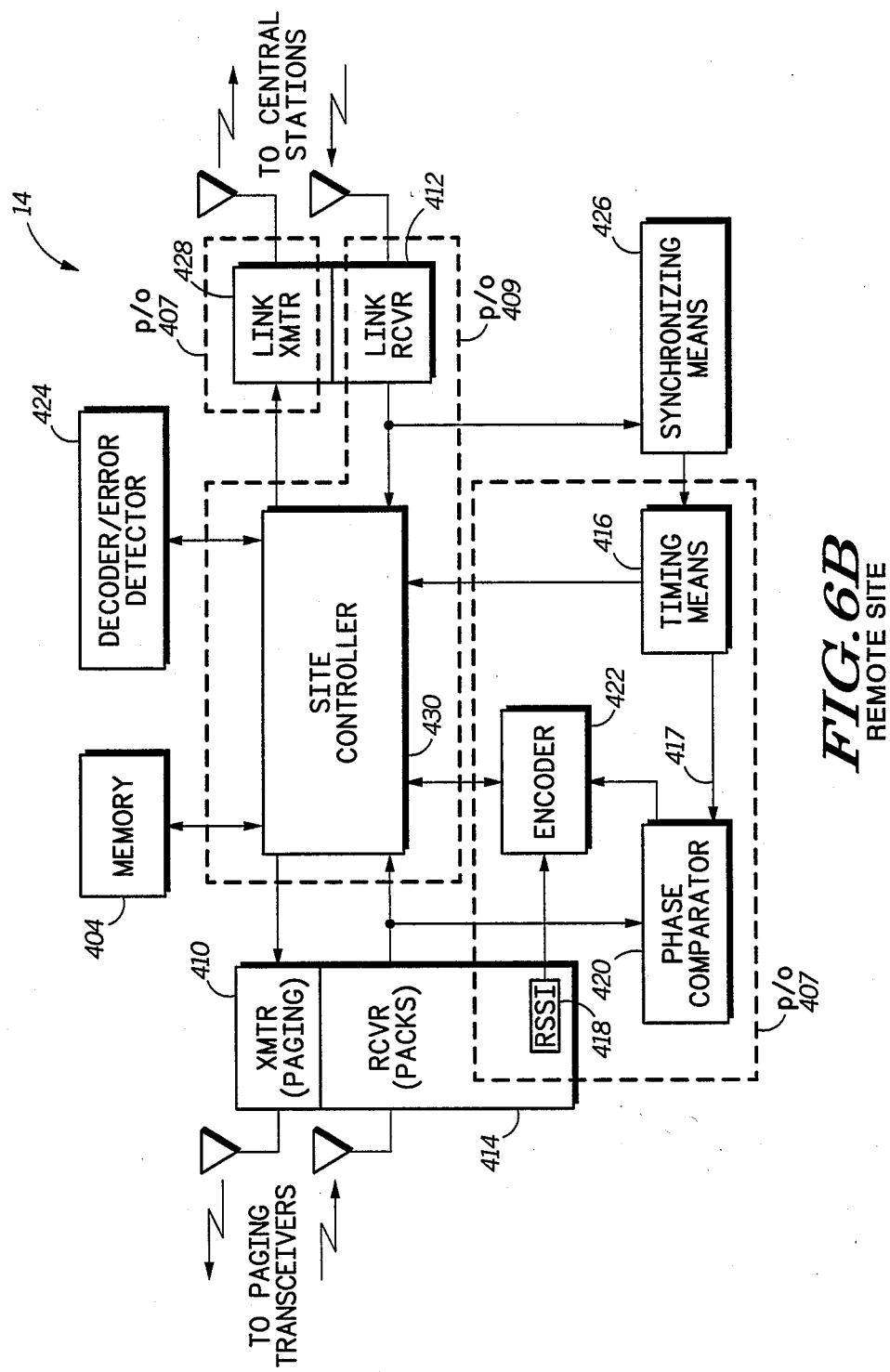

FIGS. 6A and 6B show electrical block diagrams of central station 12 and remote stations 14, respectively, for the preferred embodiment of the present invention. As can be seen in the drawings, the central station 12 and remote site stations 14 share substantially the same configurations. The central station includes telephone interconnect 400 and paging terminal 402 not found in the remote site stations, whereas remote stations 14 include synchronizing means 426 not found in the central station, the functions of which will be described in detail shortly.

Referring to FIG. 6A, central station 12 comprises telephone interconnection means, or telephone interconnect 400, which allows messages to be entered into the system through the telephone network using a telephone or alphanumeric entry device. Telephone interconnect 400 couples to paging terminal 402 which processes the information received through telephone interconnect 400. The information processed by paging terminal 402 may be DTMF or dial pulse encoded signals for telephone encoded information, or binary data suitably encoded for transmission over the phone line, such as with a modem, for alphanumeric entry device messages. Paging terminal 402 generates the appropriate paging transceiver address and stores the address and message in the active page file portion of memory 404 until the next transmission cycle. Paging terminals suitable for use in the preferred embodiment of the present invention are well known to one of ordinary skill in the art.

Paging terminal 402 couples to controller 406 which controls the operation of link transmitter 408, paging transmitter 410, link receiver 412 and the acknowledgement or PACKS receiver 414. Paging transmitter 410 is a conventional direct FM (frequency modulated) transmitter, which is well known to one of ordinary skill in the art. The PACKS receiver, is an FM receiver having a very narrow IF bandwidth, such as a 120 to 150 Hz bandwidth which provides a 20 dB improvement in receive sensitivity over a conventional FM receiver having a typical IF bandwidth of approximately 12 to 15 KHz. The increased receive sensitivity allows PACK transmissions from the paging transceivers at low power levels, such as 1 to 2 watts, as compared to the paging transmitter power of 100 watts. Minimizing the power required to transmit the acknowledgement signals results in increased battery life for the paging transceivers. The central station link transmitter, and remote station link receivers which operate at very high bit rates can utilize linear modulation techniques, such as MSK (minimum shift keying) modulation, which is well known to one of ordinary skill in the art. Other modulation techniques, such as employing high spectral efficiency digital modulation techniques are also desirable. One example of such a modulation technique is described in U.S. Pat. No. 4,737,969 to Steel et al, issued Apr. 12, 1988, entitled "Spectrally Efficient Digital Modulation Method and Apparatus" which is assigned to the assignee of the present invention, and which is incorporated by reference herein.

Controller 406 may be implemented using a microprocessor, such as a Motorola MC6809 or a Zilog Z80, or a microcomputer with suitable interface circuitry for controlling the selection and operation of the central station transmitters and receivers. Controller 406, couples to link transmitter 408, keying the link transmitter to transmit burst signal to the remote stations. Controller 406 also couples to paging transmitter 410, keying the paging transmitter to transmit the active page file within the transmission cell of central station 12. Controller 406 also couples to link receiver 412, enabling the link receiver for the reception of the SACKS, or system acknowledgement signals generated at the remote stations. Controller 406 also couples to PACKS receiver 414 enabling the receiver for the reception of the paging transceiver generated acknowledgement signals.

Timing means 416 provides a high accuracy clock which couples to controller 406 to maintain system timing for simulcast operation through synchronization of all remote stations. A high stability reference oscillator can be used for timing means 416. The reference clock frequency generated by timing means 416 is at least ten times higher than the highest address and message data bit rate used during pseudo-simulcast message transmissions. This provides the accuracy required for the determination of differential propagation delays which is required for the high speed transmission of address and messages in the pseudo-simulcast transmission mode. In an alternate embodiment of the present invention, the received acknowledgement signals are supplied to phase comparator 420, which compares the received acknowledgement signals with a reference clock output 417 of timing means 416 to determine the time of reception at each station receiving the PACK signals. The output of phase comparator 420 couples to encoder 422 for encoding the generated time of reception signals into a format suitable for processing by controller 406.

The output of PACKS receiver 414 couples to a received signal strength indicator (RSSI) 418 which is used in determining the location of the acknowledging paging transceivers. Received signal strength indicators suitable for determining received signal strength are well known to one of ordinary skill in the art. During the reception of the PACKS, the received signals are monitored by signal strength indicator 418. Signal strength indicator 418 generates a signal strength indication signal which also couples to encoder 422, such as an A/D converter which is well known in the art, for encoding into a format suitable for processing by controller 406. Controller 406 evaluates the signal strength information from each station to determine the transmission cell in which each responding paging transceiver is located. Differential propagation delays are computed from the time of reception signals, or measured propagation delay information measured at each remote station. This information is used to adjust the timing or phase for the pseudo-simulcast transmission of current frame-1 data segment at the high data bit rates.

As described above, it will be appreciated, the signal strength indicator 418, link transmitters 428 at the remote stations, a predetermined link receiver, such as link receiver 412 at the central station, and controller 406 at the central station function as an identifying means 407 for identifying the transmission cell in which the paging transceiver is located. These elements, together with the timing means 416 and phase comparator 420, function as the identifying means for identifying the transmission cell in which the paging transceiver is located, and at least one additional transmission cell adjacent to the transmission cell in which the paging transceiver is located. A predetermined link transmitter, such as link transmitter 408 at the central station, link receivers 412 at the remote stations, and site controller 430 at the remote stations function as the selecting means 409, used to accept messages tagged to particular remote stations and for selecting the remote station transmitter for transmitting the accepted messages. The criteria for transmission cell selection is very flexible. In periods of low long message traffic, the pseudo-simulcast transmission format is preferred. The pseudo-simulcast transmission format combines messages directed to specific transmission cells to the group of transmission cells selected for pseudo-simulcast transmission. This increases the relative traffic for long messages in each of the transmission cells, thereby allowing shorter time intervals to the transmission of the messages since messages can be stored in queues at the remote station for more than one transmission cycle. The number of transmission cycles during which messages are stored before transmission is a function of several factors, such as stability of the paging transceiver acknowledgment transmitter oscillator and likelihood of the paging transceiver to move from one transmission cell to another. The greater the paging transceiver transmitter oscillator stability and lower likelihood of movement to another cell after the paging transceiver has adjusted the transmit frequency and power output during the initial silent carrier transmission, the greater the number of transmission cycles can be used to store messages at the remote station before transmission.

As previously described, locating of the paging transceiver in a particular cell is based on received signal strength. The transmission cell receiving the strongest received signal from a particular paging transceiver is selected as the transmission cell in which the paging transceiver is located. Selection of additional transmission cells adjacent the transmission cell in which the paging transceiver is located is based on both signal strength and differential propagation delay measurements. Only transmission cells indicating a received signal strength of less than 20 dB down from the transmission cell in which the paging transceiver is located are suitable for selection in pseudo-simulcast operation. Additionally, of the transmission cells suitable for selection by received signal strength measurement, those cells then having the lowest differential propagation delays are finally selected. A final criterion for cell selection is that none of the transmission cells selected for pseudo-simulcast transmission are adjacent to a different group of transmission cells providing pseudo-simulcast transmission. Adjacent groups of transmission cells may be selected when actual message transmission is staggered in separate transmission cycles.

As long message traffic increases, message throughput is increased in the preferred embodiment of the present invention by maximizing transmission cell reuse. This means reducing the number of transmission cells selected for pseudo-simulcast transmission from perhaps original groups of four, to three, to two, and finally to the non-simulcast mode of one transmission cell. By utilizing transmission cell reuse and message storage, numeric message transmission efficiency can be increased to fifty percent while long message transmission efficiencies of 96 to 98 percent are possible compared to a fraction of a percent for conventional paging systems.

Implementation of the remote stations, shown in FIG. 6B, is similar to that of the central station, with the following differences. Link receiver 412 receives the burst from the central station. The SACKS, system acknowledgement signals are transmitted from the remote stations to the central station using link transmitter 428. The output of link receiver 412, couples to site controller 430, which operates in a manner similar to controller 406 and which further couples to synchronizing means 426. The synchronizing means recovers the transmitted synchronizing signal, adjusting timing means 417 to maintain synchronous operation of all transmitters within the system with the central station.

Coupled to site controller 430 is decoder/error corrector 424 which is used to correct any errors in the active page file information received from the central station during the burst signal, thereby insuring the transmission of good data from each remote site station. Error detection and correction algorithms for signaling schemes, such as for POCSAG encoded addresses and data, are well known in the art. Should it be determined the information received from the central station is corrupted beyond correction at any remote station, the system could be configured for that remote station to request a retransmission of the active page file information, although the operation of such a system is not disclosed in the present invention. The error corrected information is stored in memory 404 until the appropriate time to transmit either the address segment or message segment, as previously described.

Figure 7:
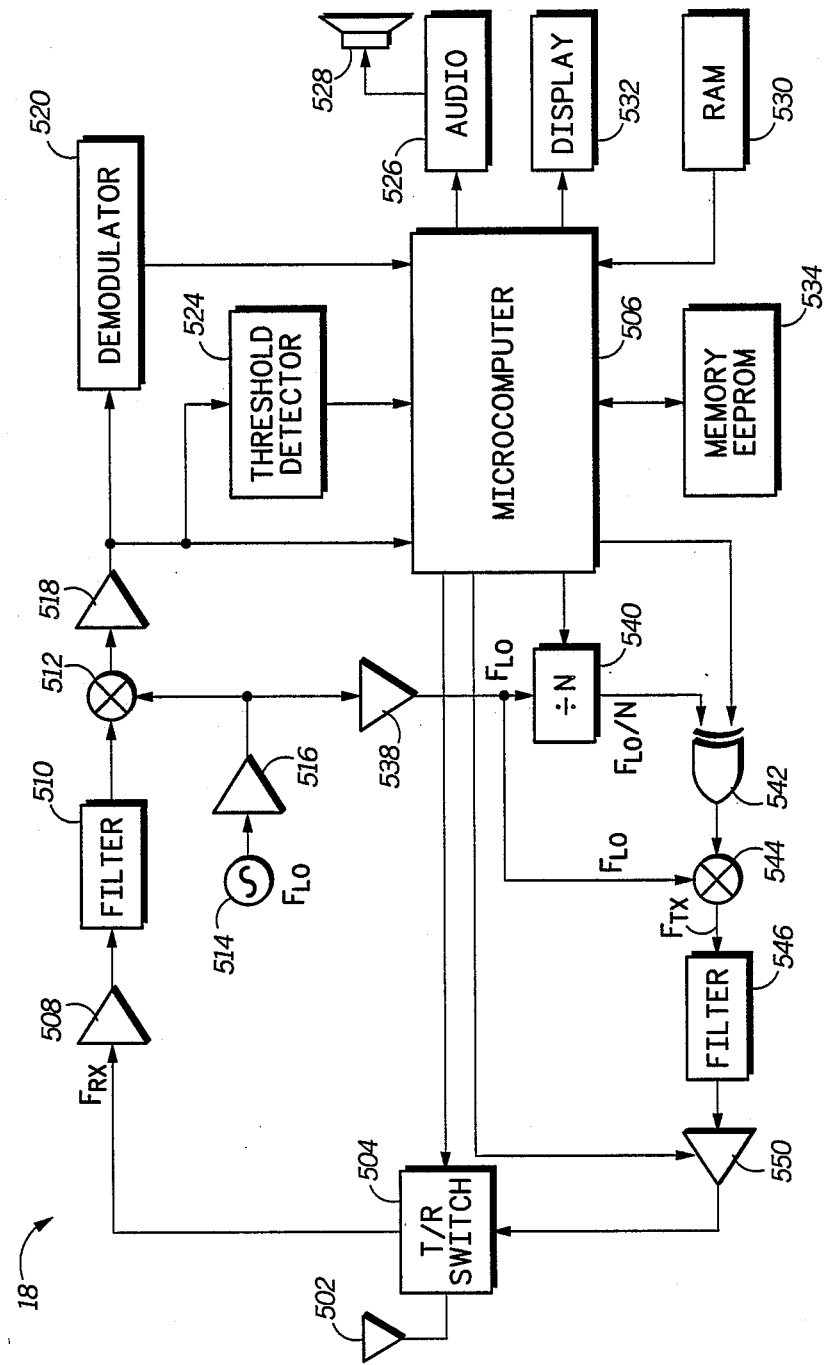
FIG. 7 is an electrical block diagram showing a paging transceiver in the preferred embodiment of the present invention.

The paging transceiver of the present invention is shown in the electrical block diagram of FIG. 7. Operation of the paging transceiver is disclosed in U. S. Pat. Application No. 07/141,654 to Siwiak et al, filed Jan. 7, 1988, entitled "Frequency Division Multiplexed Acknowledge Back Paging System", consequently only a brief operational description will be provided herein. In the receive mode, signals received by antenna 502 are coupled through T/R switch 504 for processing by the receiver portion of the paging transceiver. The receiver portion comprises an RF amplifier 508, preselector filter 510, mixer 512, local oscillator 514, buffer amplifier 516, IF amplifier 518 and demodulator 520, the operation of which is well known to one of ordinary skill in the art. Microcomputer 506, couples to the output of demodulator 520 and performs such functions as address decoding together with memory-EEPROM 522 which stores preassigned address information, in a manner well known to one of ordinary skill in the art. Alert signals generated by microcomputer 506, are coupled to audio driver 526 which are then delivered by transducer 528 also in a manner well known to one of ordinary skill in the art. A display 532 is provided to display the received messages which are stored in memory (RAM) 530 after they have been received. Microcomputer 506 controls transmitter power output by controlling amplifier 550 by sampling the output of threshold detector 524 which corresponds to the signal strength of the received unmodulated carrier signal as described in Pat. Application No. 07/141,654. Microcomputer 506 together with buffer amplifier 538, divider 540, exclusive-or gate 542, mixer 544, and filter 546 control the transmitter frequency using the received unmodulated carrier signal as a reference as described in Pat. Application No. 07/141,654.

Operation of the system of the present invention is shown in detail in the flow charts of FIGS. 8–10. FIGS. 8 A-C describe the operation of the central station. FIGS. 9 A-C describe the operation of the remote stations. FIGS. 10 A-C describe the operation of the paging transceivers within the system.

Figure 8A:
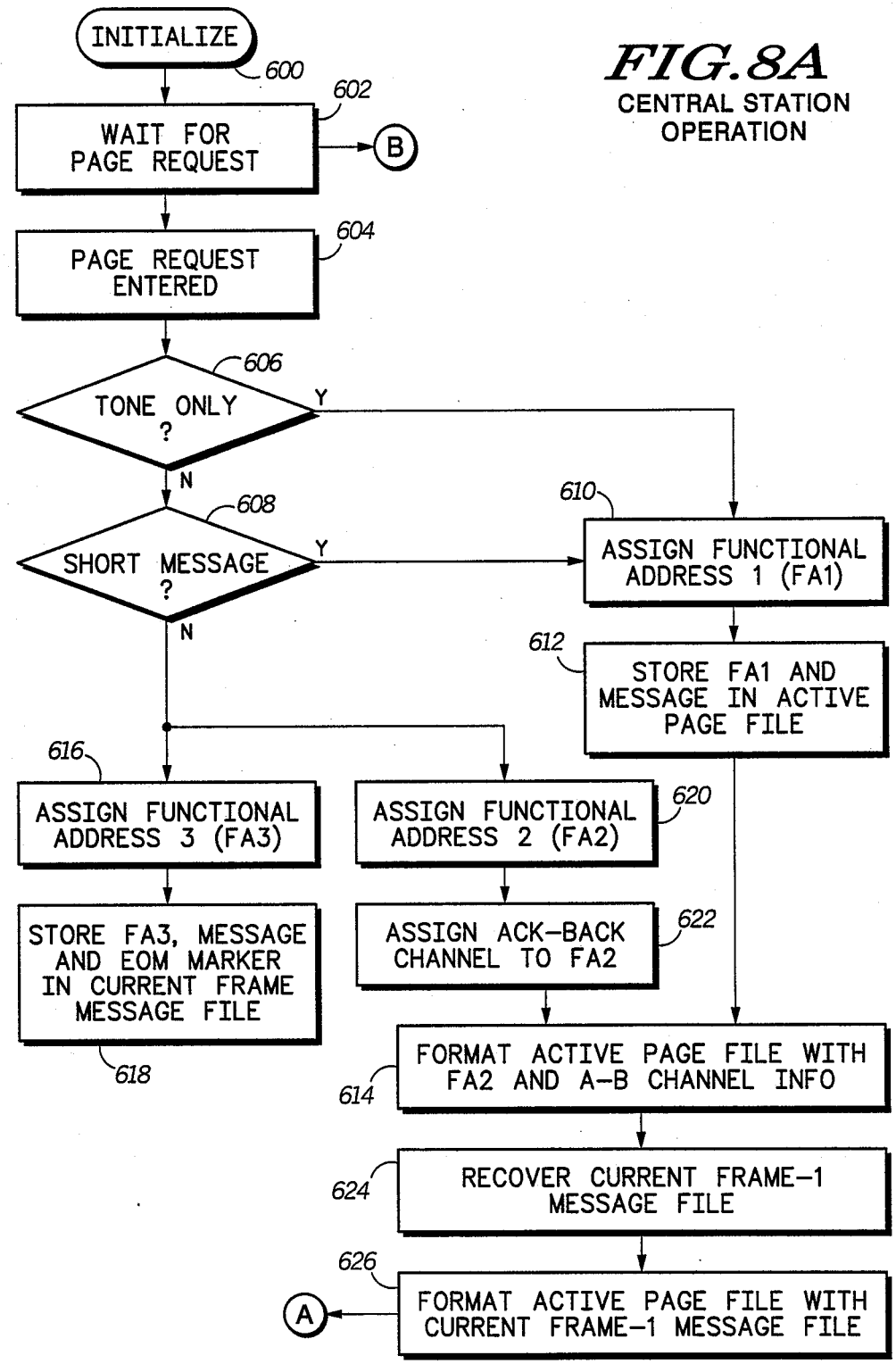
FIGS. 8A-C are flow charts showing the operation of the central station transmission facility.

Referring to the block diagram of FIG. 8A, when the system is initially turned on, the microcomputer controller is initialized, block 600. The system then waits for a page request generated from a telephone or alphanumeric messaging terminal, block 602. The page request is entered into the system, block 604. The information entered is evaluated for the nature of the page to be generated, such as tone only, short message and long message pages. If the information entered is to be processed as a tone only page, block 606, the system assigns functional address 1, block 610, corresponding to the tone only address of a paging transceiver capable of receiving multiple page types, such as tone only, numeric or alphanumeric pages. For conventional tone only receivers operating in the system, functional address 1 corresponds to the normal paging address. In the preferred embodiment of the present invention, paging transceivers can be assigned up to three functional addresses describing the operational characteristics. The purpose for the assignment and use of these functional addresses will become apparent in the description to follow. Should the information entered be a short message, block 608, such as a message capable of fitting into a single POCSAG data block, the system also assigns functional address 1, block 610, corresponding to the address of the paging transceiver to which the message is intended. As in the case of a conventional tone only paging receiver, conventional numeric paging receivers are assigned functional address 1 corresponding to their normal paging address. The handling of tone only and short message addresses is shown in FIG. 4. These addresses are included in the current frame address field where they are always positioned at the end of the address queue in the active page file, as shown in block 612, after those addresses assigned to paging transceivers having acknowledgment capability, as previously described.

When a long message is to be transmitted, the system assigns functional address 2, block 620, and an ack-back channel, block 622. Functional address 2 is always transmitted at the first data bit rate, such as 1200 bits per second, and when decoded by the paging transceiver, indicates an acknowledgement response is to be generated at the appropriate time. Furthermore, functional address 2 indicates information to follow in the next transmission cycle will be at the higher, or second data bit rate which the paging transceiver is capable of receiving. This information is stored in the active page file, block 614. The system also assigns functional address 3 to the message, block 616, and stores this additional information along with an end of message marker in the current frame message file, block 618. Functional address 3 is always transmitted at the second data bit rate and indicates data is to follow also transmitted at that rate. Furthermore, functional address 3 indicates the paging transceiver is to switch to the first data bit rate once the message has been received. This information is held in the current frame message file until the paging transceivers'locations have been determined, as will be explained shortly.

Figure 8B:
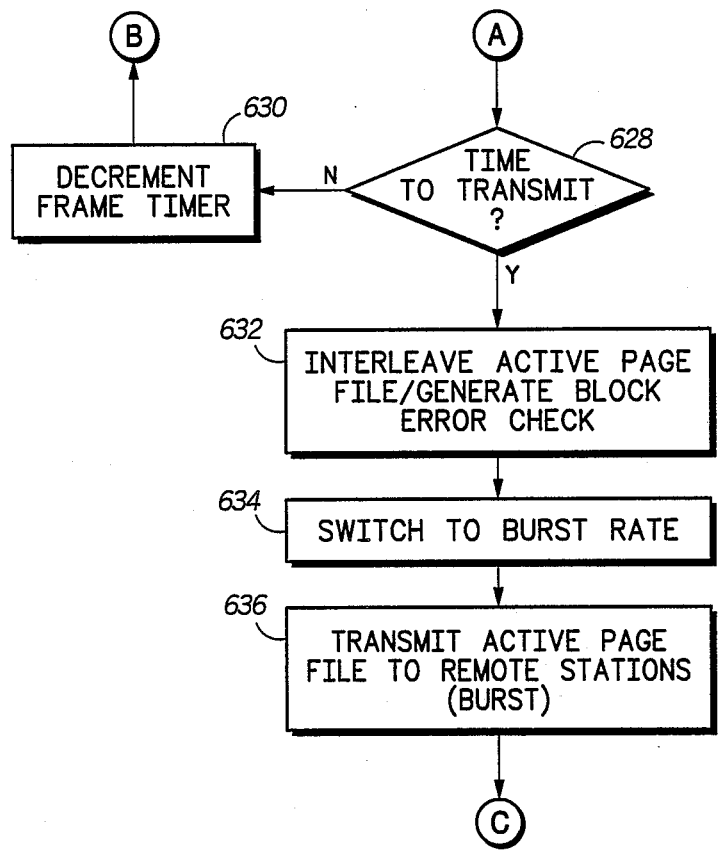

The current frame-1 message file is recovered, block 624 and formatted with the active page file, block 626. Continuing with FIG. 8B, the controller continues to monitor when it is time to transmit the burst signal, block 628, decrementing the frame timer, block 630, and returning to wait for any additional page requests, block 602. As shown in FIG. 8B, when the controller determines it is time to transmit the burst signal, the information in the active page file is interleaved, in a manner well known to one of ordinary skill in the art, and a block error check bit is generated, block 632. Interleaving the data reduces the transmitted burst error rate when the active page file is transmitted to the remote stations. The controller than switches the timing to the burst signal rate, block 634, and transmits the active page file to the remote stations, block 636.

Figure 8C:
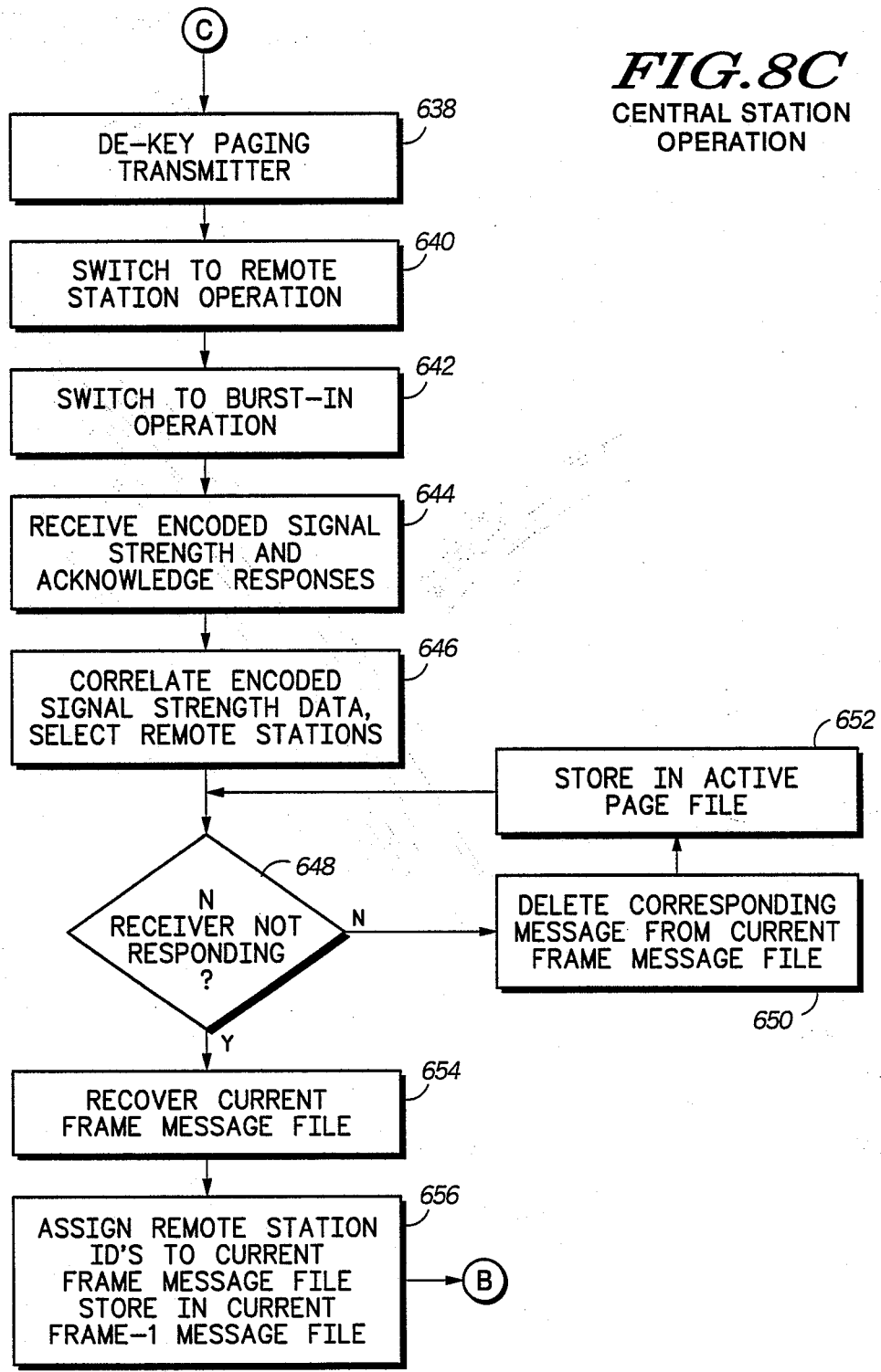

Continuing with FIG. 8C, the central station then switches to remote station operation, block 638, for the transmission of the active page file information within the central station transmission cell. A complete description of the remote station operation will be provided with the description of FIGS. 9 A-C. At the termination of remote station operation, the paging transmitter is de-keyed, block 640. The controller then selects the SACKS receiver, switching to the burst-in operation, block 642. The system generated acknowledgement responses which include encoded signal strength information is received at the central station, block 646 during the SACKS transmission. In the alternate embodiment of the present invention, time of reception information, as well as signal strength information, would have been transmitted from the remote stations. The encoded signal strength information is decoded, and the information correlated with similar information from each responding station to determine the transmission cell, or cells, in which each of the responding paging transceivers is located, block 646. Should any paging transceiver fail to respond, as would happen when the paging transceiver is turned off, has a bad battery, or is out of range of the system, the message corresponding to that unit is deleted from the current frame message file, block 650, and stored in the active page file being generated for the next transmission cycle, block 652. It will be appreciated by one of ordinary skill in the art, that it may be more appropriate to delay the transmission of a message to the paging transceiver which fails to respond, in perhaps five minute intervals. The current frame message file is recovered, block 654, remote station ID's are assigned to the current frame message file for those paging transceivers which responded, and the file is then stored in the current frame-1 message file, block 656, for transmission during the next transmission cycle.

Figure 9A:
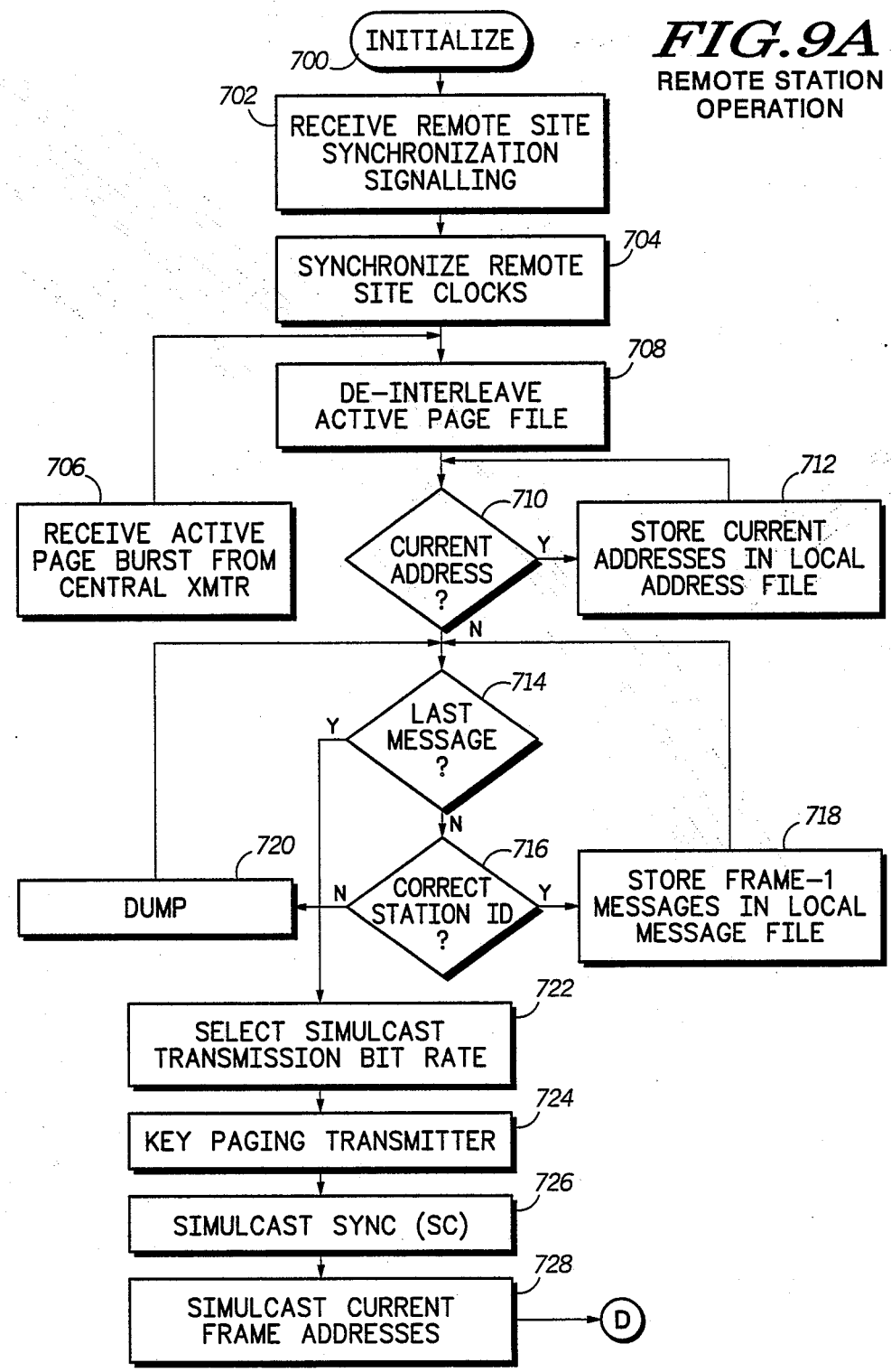
FIGS. 9A-C are flow charts showing the operation of the remote site transmission facilities.
Figure 9B:
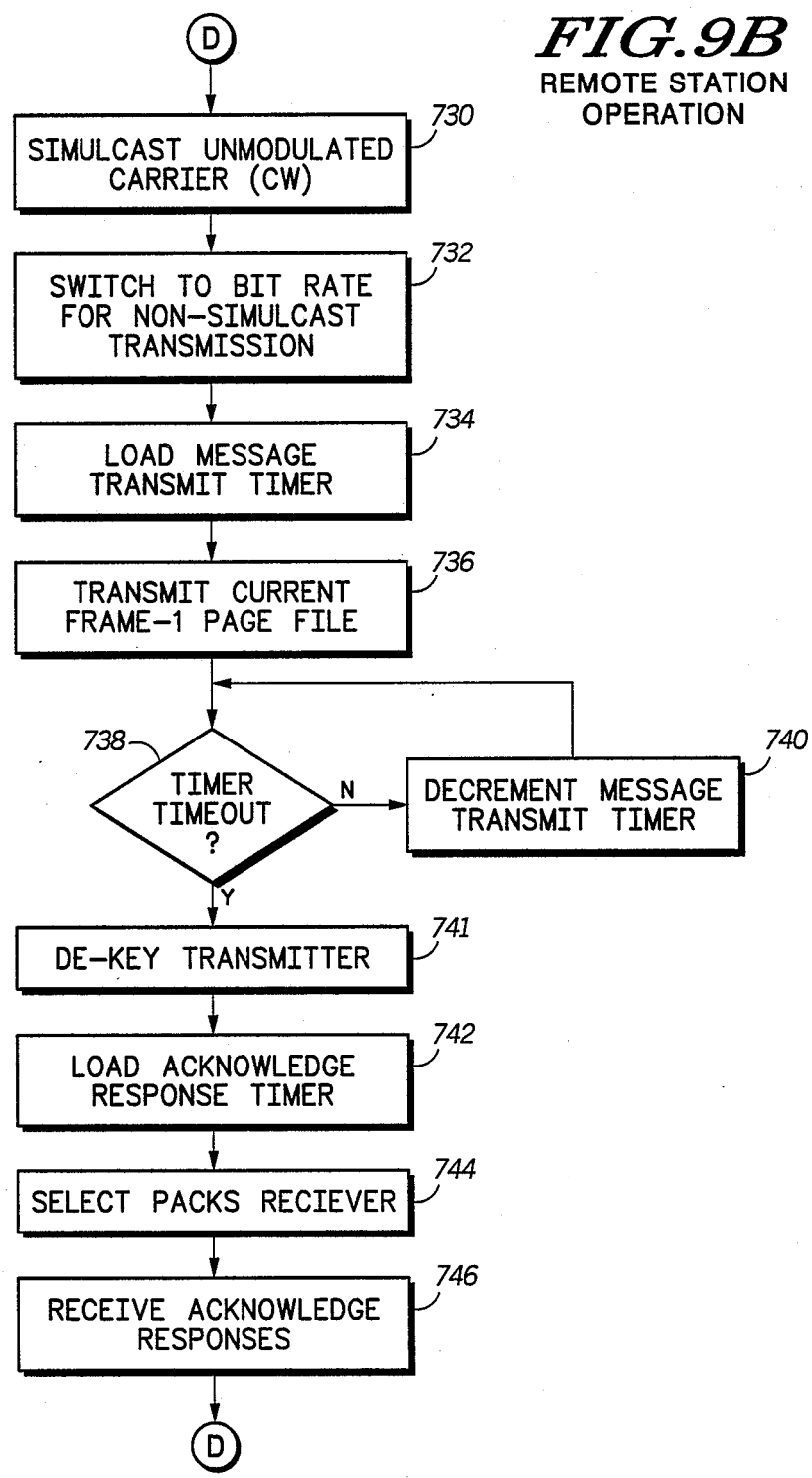
Figure 9C:
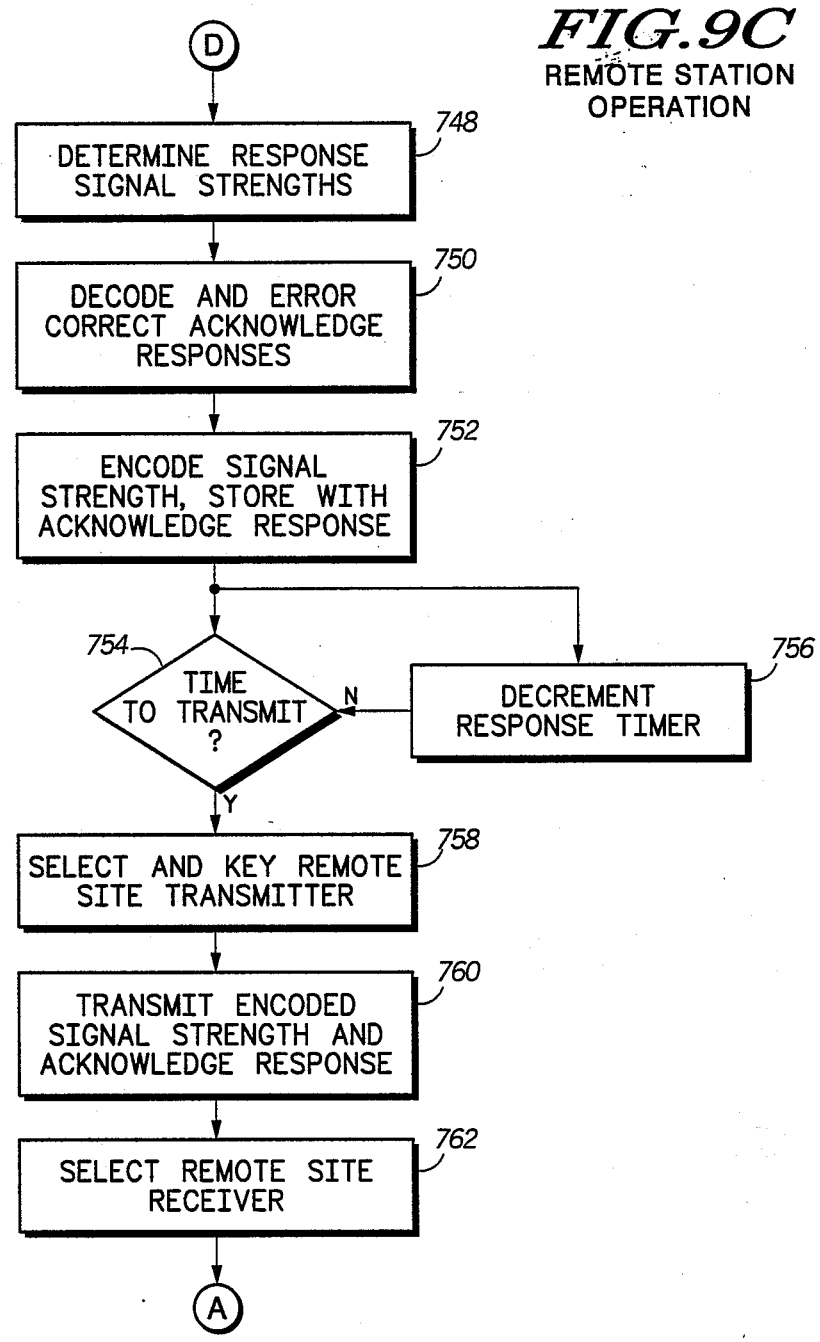

The operation of the remote stations is described in the flow charts of FIGS. 9 A-C. Referring to FIG. 9A, when the remote stations are first turned on they are initialized, block 700, which includes selection of the link receiver for monitoring transmissions from the central station. Once synchronization signals transmitted in the burst signal from the central station are detected, block 702, the remote site clocks synchronize with the central station, block 704. The remote site stations can then receive the active page file transmitted in the burst signal, block 706. The active page file information which was interleaved at the central station, is deinterleaved at the remote site stations, block 708. The deinterleaved active page file data can be checked for errors in transmission, the errors corrected, and the message segment of the active page file can then be re-interleaved for final transmission to the paging transceivers, thereby significantly reducing the final message error rate. The de-interleaved active page file is sorted by the address and message segments. The current frame addresses to be simulcast transmitted are identified, block 710, and stored in a current address file at each remote site station, block 712. The message segment of the active page file is next sorted for station ID, block 716. Those messages not flagged with an ID corresponding to each individual station are dumped, block 720. Those messages having an ID corresponding to the particular station are stored in a local message file, for transmission at the appropriate time, block 718. After the last message has been processed, block 714, the controller selects the simulcast transmission bit rate, block 722. The controller then keys the transmitter, block 724. The sync portion of the address field is transmitted, block 726, followed by the current frame addresses, block 728. Continuing with FIG. 9B, after the address segment has been transmitted, modulation is cut off, and unmodulated carrier is transmitted, block 730. The controller then selects the non-simulcast bit rate, block 732 for those stations having messages to be transmitted. The message transmit timer is loaded, block 734, which defines the time for transmission of the message segment, and transmits the local message file, block 736. If the message timer has not timed out, block 738, after all messages for a particular transmission cell have been transmitted, the controller continues to decrement the message transmit timer, block 740. When message transmit timer timeout has occurred, the paging transmitter is de-keyed, block 741. The acknowledge response time is loaded, block 742, corresponding to the time interval paging generated acknowledgment signals are to be received. The controller then selects the PACK receiver, block 744, for reception of the PACKS, block 746. Continuing with FIG. 9C, by means of the received signal strength indicator, the controller further determines the acknowledgement response signal strength of all responding paging transceivers, block 748. The encoded acknowledgment responses are decoded and error corrected, block 750, minimizing errors in the location of the responding paging transceivers. The encoded signal strength are temporarily stored, block 752, until it is time to transmit the SACKs, block 754. If it is not time to transmit the SACKs, the response timer is continued to be decremented, block 756, until it is time to transmit. The controller then selects and keys the remote link transmitter, block 758, for transmission of the encoded signal strength and acknowledge response information, block 760. After the SACKs have been transmitted, the controller again selects the remote link receiver, block 762, in preparation for the reception of the next burst signal from the central station.

Figure 10A:
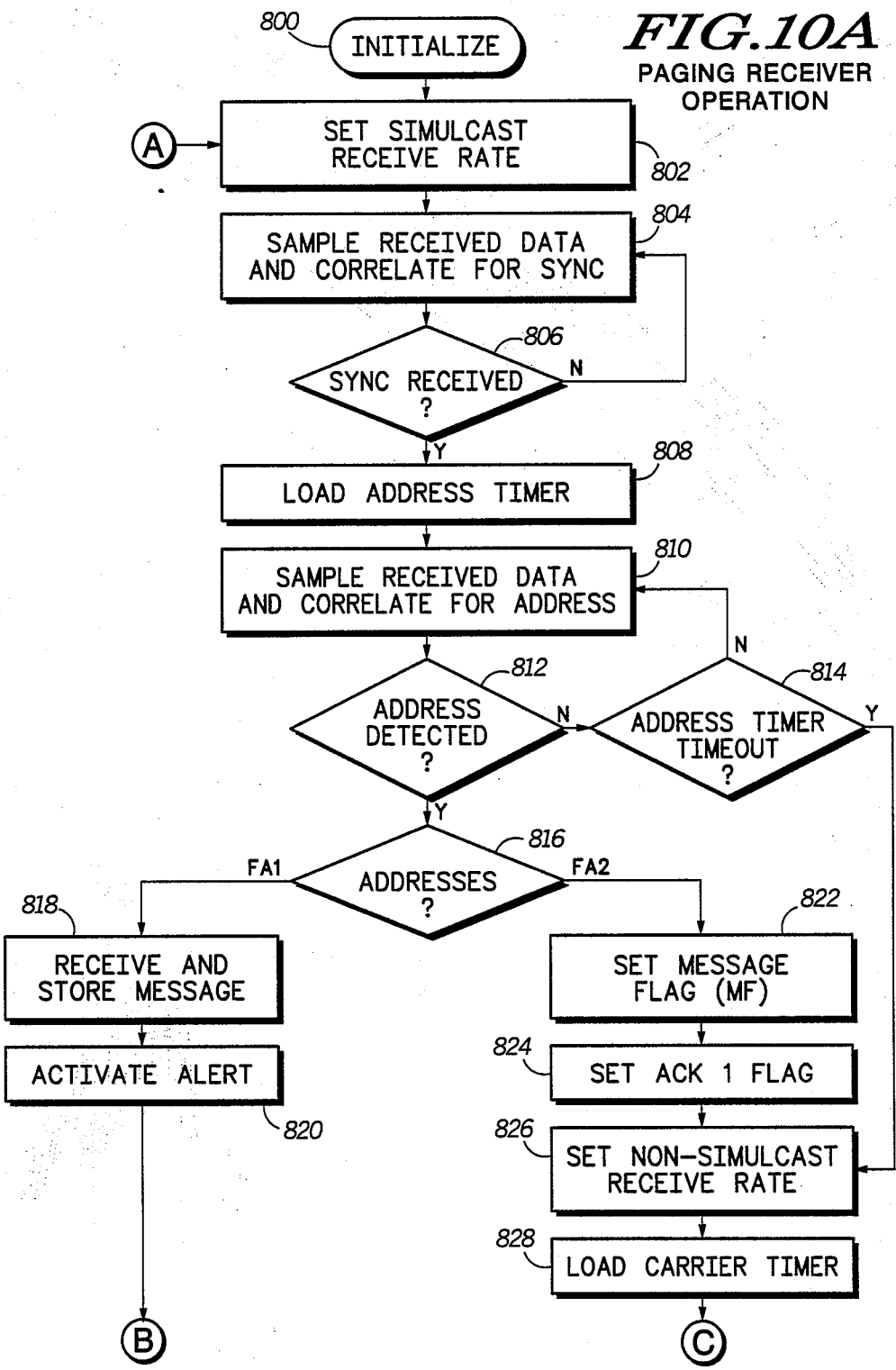
FIGS. 10A-C are flow charts showing the operation of the paging transceivers of the present invention.
Figure 10B:
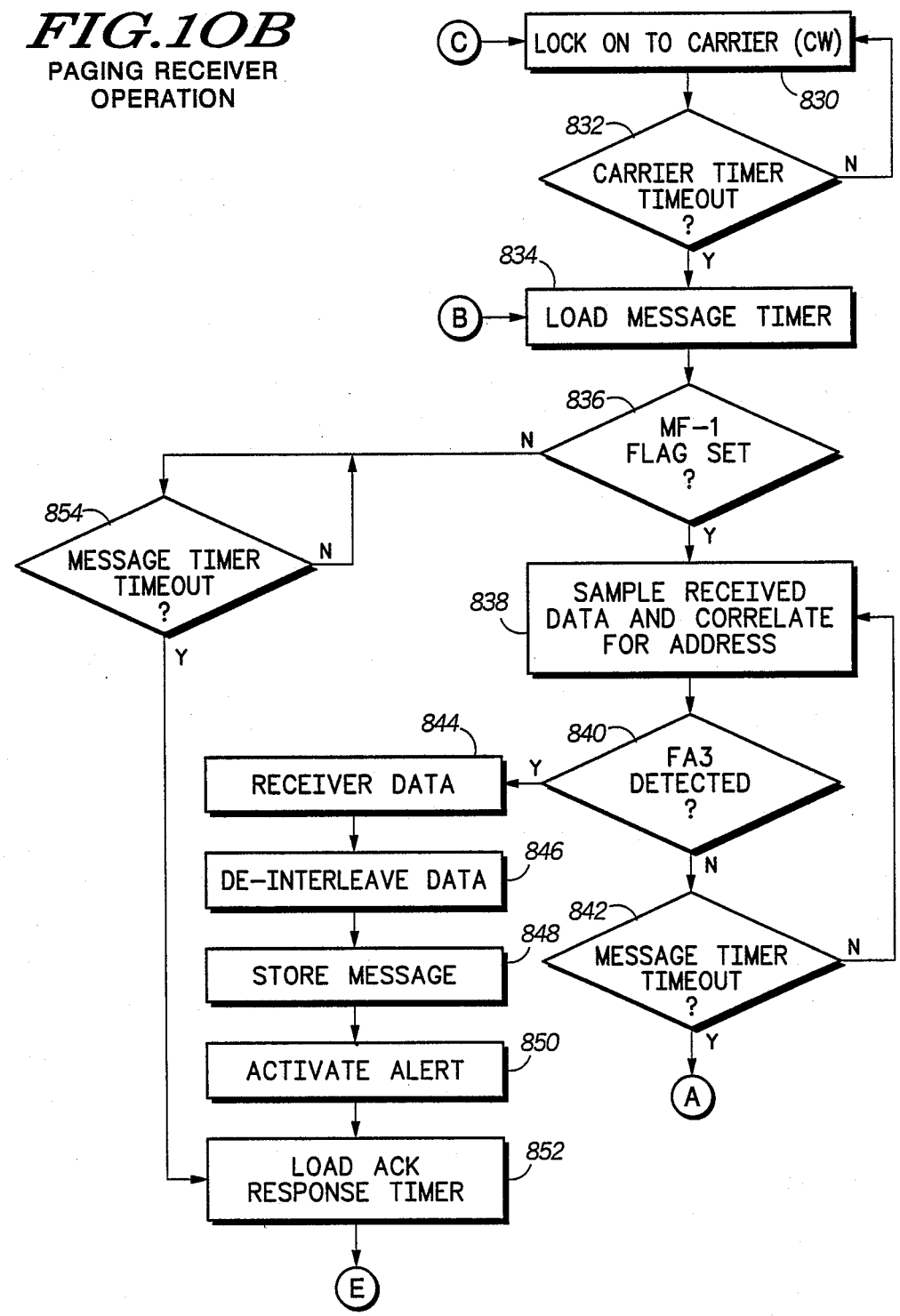

Operation of the paging transceivers is described by the flowcharts of FIGS. 10 A-C. Referring to FIG. 10A, each time a paging transceiver is turned on, the microcomputer controlling the operation of the paging transceiver is initialized, block 00. The paging transceiver is set to the simulcast transmission receive rate, block 802. The paging transceiver then begins to sample information received on the channel, block 804. If the sync information is not received, block 806, the paging transceiver continues to monitor the channel, until it is received and detected. The address timer is then loaded, block 808, and the received data is sampled for address, block 10. If data corresponding to the paging transceiver's preassigned address is not detected, block 812, the paging transceiver continues to sample data until the address timer times out, block 814, or until a preassigned address is detected, 816. If the paging transceiver, detects functional address 1 (FA1), block 818, the paging transceiver activates the alert circuitry, block 820, informing the user a page has been received. Paging transceivers responding to FAI do not acknowledge in the system, as was previously described. If the address detected is functional address 2 (FA2), block 816, the message flag is set, block 822, and the acknowledge flag is set, block 824. The paging transceiver is then set to the non-simulcast receive rate, block 826. The carrier timer is loaded, block 828, providing the time interval during which the unmodulated carrier is to be detected. Continuing with FIG. 10B, the paging transceiver locks onto the carrier, block 830, to calibrate the paging transceiver's acknowledgement response transmitter frequency, and power level, when required, block 830. After carrier timer timeout, block 832, the message timer is loaded, block 834. The message timer corresponds to the time interval the message segment of the transmission is transmitted. The MF-1 flag is next checked, block 836. If the MF-1 flag is not set, block 836, the paging transceiver is in the current transmission frame, and any forthcoming messages will not be directed to it. In this instance, the paging transceiver waits for the message timer to time out, block 854, and then loads the acknowledgement response timer, block 852. When the MF-1 flag is set, block 836, the current transmission cycle is completed, and the next transmission cycle is in progress. The paging transceiver samples the received information, correlating for address, block 838. Messages transmitted during the message segment of the transmission cycle are transmitted using the functional address 3 (FA3) address, as previously stated. If FA3 is not detected, block 840, the address detected did not correspond to that paging transceiver. Should none of the received addresses match the paging transceivers preassigned address, and message timeout has not occurred, block 840, the paging transceiver continues to search for the preassigned address. If FA3 was detected, block 844, the following data, corresponding to the message, block 844, is received. This data is de-interleaved, block 846, and then stored, block 848. Upon completing the reception and storage of the message, the user is alerted, block 850.

Figure 10C:
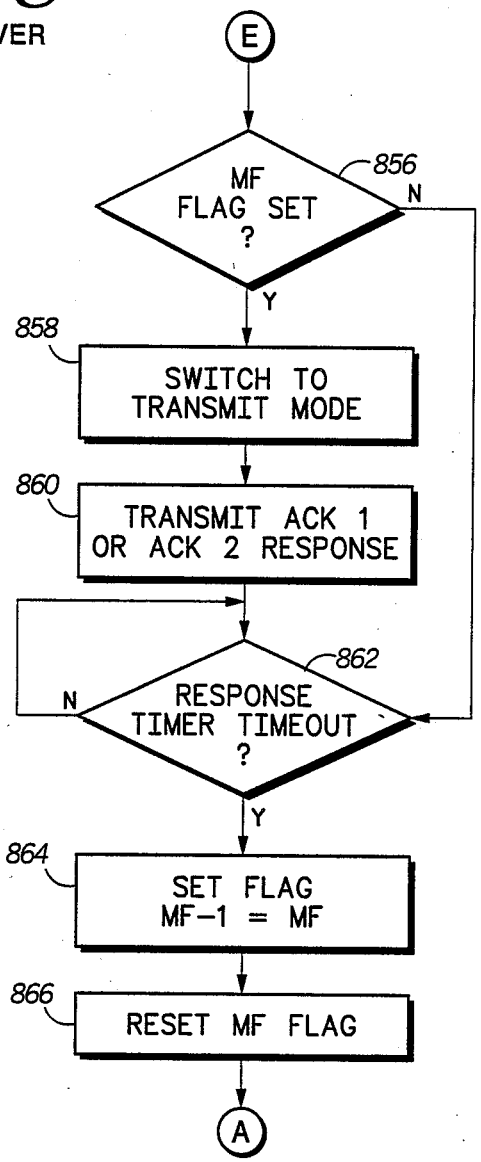

Returning to block 852, after the acknowledgement response timer is loaded, the paging transceiver checks to see if the MF flag was set, block 856 of FIG. 10C. The MF flag indicates the paging transceiver is to provide an acknowledgement response at the appropriate time. The paging transceiver then switches to the transmit mode, block 858, transmits the acknowledgement response, either ACK1 or ACK2, block 860. Transmission of an ACK1 response indicates the address received was received without any non-correctable errors. Should the message be received with more errors than can be corrected, the FA2 response is transmitted. The acknowledgement response is transmitted until the acknowledgment response timer times out, block 862. The MF-1 flag is then set corresponding to the MF flag, block 864, and the MF flag is then reset, block 866, returning the paging transceiver to sample for sync information, block 802 of FIG. 10A.

In summary, a high data rate simulcast communication system has been described which provides efficient transmission of long numeric or alphanumeric data messages. The signaling format of the preferred embodiment of the present invention also ma be easily integrated into a conventional POCSAG paging system. Referring back to FIG. 3, it will be appreciated that synchronization codeword 104 together with address segment 106 represents a conventional POCSAG batch in both structure and transmission time. In the preferred embodiment of the present invention, the time interval required to transmit silent carrier 112, message segment 114, PACKS 118, and SACKS 120 would be equal in time to a POCSAG batch. Such a system can support both conventional paging receivers and paging transceivers as described herein. During those time periods when no long alphanumeric messages have been entered into the system, the system operates much like a conventional POCSAG paging system. As tone only and numeric messages are received, the paging terminal would format them into conventional POCSAG batches distributed about the system during the burst signal 102. The sequences of POCSAG batches are then transmitted in the standard simulcast transmission mode. As long messages are entered into the system, they would be processed in the manner of the preferred embodiment of the present invention. As previously described, long messages may be accumulated in the local message file at the remote site stations until such time as the queue is full, further enhancing message throughput from any remote site station. As an example, by providing frequency re-use, such as four independent transmission zones in a typical system for message segment transmission, and increased data bit rate transmission capability, such as 4800 bits per second versus 1200 bits per second, long message throughput can be increased sixteen times that of a conventional paging system. Those factors limiting frequency re-use, as previously explained, can increase or decrease the actual long message throughput from the value indicated in the example above.

While specific embodiments of this invention have been shown and described, further modifications and improvements will occur to those skilled in the art. All modifications which retain the basic underlying principles disclosed and claimed herein are within the scope of the present invention.

We claim:

1. A method for transmitting a message to a paging transceiver in a communication system comprising a plurality of transmission calls defining different geographical areas, each transmission cell having a transmitter for transmitting an address identifying the paging transceiver and the message, and a receiver for receiving an acknowledgement signal generated by the paging transceiver, said method comprising the steps of:
   transmitting the address at a first data bit rate, the address being simulcast from the transmitters located within each of the plurality of transmission cells;
   transmitting the acknowledgement signal from the paging transceiver in response to having received the address;
   receiving the acknowledgement signal by at least one receiver located within the plurality of transmission cells;
   identifying the transmission cell in which the paging transceiver is located from the received acknowledgement signal; and
   selecting the transmitter in the transmission cell in which the paging transceiver is located for transmitting the address and the message at a second data bit rate higher than the first data bit rate.

2. The method according to claim 1 wherein each of said plurality of transmission cells further has a link transmitter and a link receiver, the link transmitters for communicating to a predetermined link receiver located in one of the plurality of transmission cells, said step of identifying comprising the steps of:
   deriving information from the acknowledgement signal received in each transmission cell;
   transmitting the information derived in each transmission cell from the link transmitter to the predetermined link receiver; and
   correlating the information received at the predetermined link receiver to identify the transmission cell in which the paging transceiver is located.

3. The method according to claim 1 wherein a predetermined link transmitter is located in one of the plurality of said plurality of transmission cells further having a link receiver, said step of selecting further comprising the steps of:

formatting the address and the message with information identifying the transmission cell in which the paging transceiver is located;

transmitting the formatted information to the link receivers located in each of the plurality of transmission cells from the predetermined link transmitter;

accepting the formatted information only at the transmission cell in which the paging transceiver is located; and transmitting the address and the message from the transmitter in the transmission cell in which the paging transceiver is located at the second data bit rate higher than the first data bit rate.

4. A system for transmitting a message, said system comprising:

a plurality of transmission cells defining different geographical areas, each having a transmitter for simulcast transmission of an address identifying a portable transceiver at a first data bit rate, and further for selectively transmitting the address and the message at a second data bit rate higher than the first data bit rate;

a paging transceiver, having means for generating and transmitting an acknowledgement signal in response to receiving the transmitted address at the first data bit rate;

a receiver, located within each of said plurality of transmission cells, for receiving the transmitted acknowledgement signal;

identifying means, responsive to the acknowledgement signal received from each of said plurality of transmission cells, for identifying the transmission cell in which said paging transceiver is located; and selecting means, responsive to said identifying means, for selecting only said transmitter in said transmission cell in which the paging transceiver is located for transmitting the address and the message at the second data bit rate higher than the first data bit rate.

5. The system according to claim 4 wherein said first data bit rate for transmitting the address is 512 or 1200 bits per second.

6. The system according to claim 4 wherein said second data bit rate for transmitting the address and message is 2400 or 4800 bits per second.

7. The system according to claim 4 wherein said identifying means comprising:

a signal strength indicator, responsive to the received acknowledgement signal in each of said plurality of transmission cells, for generating a signal strength indication signal;

link transmitters, located within each of said plurality of transmission cells, for transmitting the signal strength indication signal generated in each of said plurality of transmission cells;

a predetermined link receiver, for receiving the signal strength indication signals transmitted by said link transmitters from each of said plurally of transmission cells; and a controller, responsive to the received signal strength indication signals, for identifying the one transmission cell of said plurality of transmission cells in which said paging transceiver is located.

8. The system according to claim 4, wherein said selecting means comprising:

a predetermined link transmitter, coupled to said identifying means, for transmitting the address, the message and information identifying said transmission cell in which said paging transceiver is located;

link receivers, located in each of said plurality of transmission cells, for receiving the address, the message and the information identifying said transmission cell in which said paging transceiver is located; and site controllers, coupled to each of said link receivers, for accepting the information identifying said transmission cell in which said paging transceiver is located and for selecting said transmitter for transmitting the address and the message information only in said transmission cell in which said paging transceiver is located.

9. The system according to claim 7, wherein said identifying means further comprising encoding means, coupled to said signal strength indicator, for encoding the signal strength indication signal for transmission.

10. The system according to claim 7 wherein said identifying means further comprising:

timing means, for generating timing signal; and phase comparator means, coupled to said timing means and responsive to the received acknowledgement signal, for generating a propagation delay signal, and wherein said controller is further responsive to the received propagation delay signals, for identifying the one transmission cell of said plurality of transmission cells in which said paging transceiver is located when the signal strength received at any two cells is equal.

* * * * *